US008868786B1

(12) United States Patent
Kutchmark et al.

(10) Patent No.: US 8,868,786 B1
(45) Date of Patent: *Oct. 21, 2014

(54) APPARATUS, SYSTEMS AND METHODS FOR TRANSFORMATION SERVICES

(75) Inventors: Michael Kutchmark, Clinton, PA (US); Randal Heuler, McMurray, PA (US); Robert Bills, Greensburg, PA (US); W. Scott Edwards, New Castle, PA (US); Sergiy Nepomyashchyy, Evans City, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 619 days.

This patent is subject to a terminal disclaimer.

(21) Appl. No.: 13/088,877

(22) Filed: Apr. 18, 2011

Related U.S. Application Data

(62) Division of application No. 11/804,664, filed on May 18, 2007, now Pat. No. 7,949,788.

(51) Int. Cl.
*G06F 15/16* (2006.01)
*G06F 21/10* (2013.01)
*H04L 29/06* (2006.01)
*G06F 21/44* (2013.01)
*H04L 29/08* (2006.01)

(52) U.S. Cl.
CPC .......... *H04L 29/08756* (2013.01); *G06F 21/10* (2013.01); *H04L 63/10* (2013.01); *G06F 21/44* (2013.01); *H04L 29/06* (2013.01); *H04L 63/08* (2013.01)
USPC ............... 709/246; 709/201; 709/229; 726/4; 726/29

(58) Field of Classification Search
None
See application file for complete search history.

(56) References Cited

U.S. PATENT DOCUMENTS

| 5,666,362 | A | 9/1997 | Chen et al. | |
|---|---|---|---|---|
| 5,954,829 | A | 9/1999 | McLain et al. | |
| 7,711,647 | B2* | 5/2010 | Gunaseelan et al. | 705/59 |
| 7,761,484 | B2* | 7/2010 | Christensen et al. | 707/807 |
| 7,949,788 | B2 | 5/2011 | Kutchmark et al. | |
| 8,046,579 | B2* | 10/2011 | Kresina | 713/155 |
| 8,160,255 | B2* | 4/2012 | Fluhrer | 380/277 |
| 8,346,929 | B1* | 1/2013 | Lai | 709/226 |
| 2002/0019931 | A1 | 2/2002 | Prinoth et al. | |
| 2005/0180352 | A1 | 8/2005 | Gerovski et al. | |
| 2006/0287593 | A1 | 12/2006 | Jaggu et al. | |
| 2007/0266414 | A1* | 11/2007 | Kahn et al. | 725/113 |

OTHER PUBLICATIONS

Goessner, Stefan. "Converting Between XML and JSON." XML.com. N.p., May 31, 2006. Web. Nov. 25, 2013.*
Office Action mailed Mar. 10, 2010 in U.S. Appl. No. 11/804,664.
Office Action mailed Jun. 1, 2010 in U.S. Appl. No. 11/804,664.
Notice of Allowance mailed Feb. 8, 2011 in U.S. Appl. No. 11/804,664.

\* cited by examiner

*Primary Examiner* — Saleh Najjar
*Assistant Examiner* — Jason Plotkin
(74) *Attorney, Agent, or Firm* — Buchanan Ingersoll & Rooney PC; Robert J. Pugh

(57) ABSTRACT

A web services hub receives a request from a data source system, transforms the request, and transmits the transformed request to an external system. A secure service router is coupled to the web services hub. The secure service router authenticates the data source system and locates a transformation service to transform the request.

17 Claims, 4 Drawing Sheets

APPARATUS, SYSTEMS AND METHODS FOR TRANSFORMATION SERVICES

CROSS-REFERENCE TO RELATED APPLICATION

This application for patent is a divisional of currently pending U.S. patent application Ser. No. 11/804,664 filed on May 18, 2007, and issued as U.S. Pat. No. 7,949,788 on May 24, 2011, the disclosure of which is herein incorporated by reference in its entirety.

FIELD

Data communications between computer applications or networks and more particularly secure routing and data transformation over one or more communications networks.

BACKGROUND

Corporate reliance on technology has increasingly become more complex and pervasive. The latest advances in information technology have resulted in computer applications that are much faster and more efficient. However, the proliferation of different computer systems and applications that use different communications protocols, security mechanisms, languages, data structures and platforms has also made the information technology infrastructure of the typical business enterprise more complex. Different business processes within a typical corporate enterprise may use different computer applications or networks. In such a scenario, each computer application or network is secured and optimized for a particular business process, rather than for the enterprise as a whole. For example, a bank may have one computer application for securely accepting new customer account information and another to verify the credit worthiness of customers using sensitive data such as their social security numbers. Accordingly, the credit verification computer application may implement a more stringent data security standard than the computer application accepting new customer account information. In such a situation, source computer applications have to employ a compatible encryption standard, or authentication mechanism such as, for example, the OASIS Web Services Security (WSS) WS-Security v1.1 standard, to secure messages before sending them to the target credit verification computer application.

In other situations a source computer application or network within a corporate enterprise, for example, a bank, may need to share confidential customer information with external networks of partners or other organizations. As a result, in addition to the risk of data loss or corruption and exposure of confidential internal business transactions, there is a risk of exposing sensitive customer data to third parties. Thus a need exists for an intermediary transformation service to assign appropriate security controls to messages from source computer applications or networks prior to their transmission over a communications network.

SUMMARY

In one embodiment, a web services hub receives a request from a data source system, transforms the request, and transmits the transformed request to an external system. A secure service router coupled to the web services hub authenticates the data source system and locates a transformation service to transform the request.

DESCRIPTION

This description should be read in conjunction with the attached drawings. In this description, like numbers refer to similar elements within various embodiments. The skilled artisan will readily appreciate that the embodiments described herein are merely exemplary and that variations can be made without departing from the scope of the described embodiments.

Embodiments of an apparatus, methods and systems for transforming and securely routing messages over one or more communication networks are described. One embodiment relates to an intermediary web services hub that may be configured to enable secure communications between a plurality of data sources such as databases, computer applications and/or internal or external networks, for example intranets, local area networks (LANs) or wide area networks (WANs). In such an embodiment, the intermediary web services hub may be implemented as a general computer system comprising computer applications implementing business processes and services, logging and process flow control modules, service routers, processing units, memory units and I/O components.

Another embodiment relates to a method of transforming, securing and routing messages over one or more communication networks. In such an embodiment, the method provides a module for processing messages from a plurality of data sources prior to their transmission over a communications network. Accordingly, the module authenticates messages from data sources to ensure compliance with security standards and service level agreements (SLAs). In various embodiments, the transformed messages may be transmitted securely to an external target computer application or network. Accordingly, additional security controls may be imposed on the messages without altering their form to prevent disclosure to third parties.

Various embodiments relate to the assignment of compliant security controls in the form of, for example, digital credentials, to messages from one or more of a plurality of data sources attempting to connect with a secure network. Other embodiments of the intermediary web services hub may further authenticate data sources systems, computer application or network sending messages or requests over an enterprise network.

Figure 1:
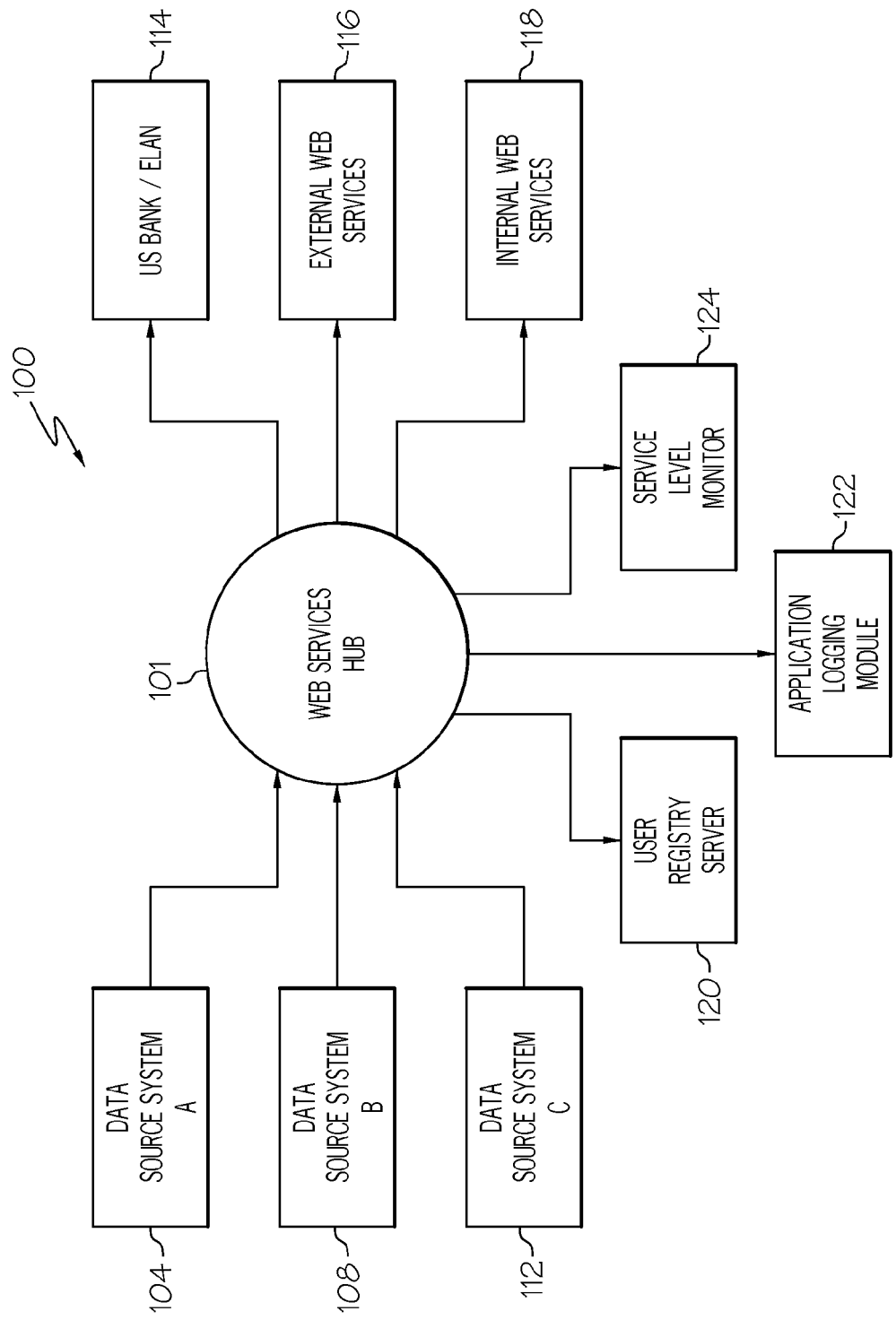
FIG. 1 is a high-level schematic diagram of one embodiment of a business enterprise network that includes a web services hub, a plurality of business processes employing one or more data sources and internal and external web components and services.

FIG. 1 is a high-level schematic diagram of one embodiment of a business enterprise network 100 that includes a web services hub 101, a plurality of business processes employing one or more data source systems 104, 108, 112, internal and/or external web services 114, 116, 118 and/or components 120, 122, 124. In various embodiment, business enterprise network 100 may include a plurality of business processes, each of which may include a plurality of different computer applications, monitoring, security and logging applications, networks and databases. Accordingly, various business processes in business enterprise network 100 may employ one or more protocols to communicate with one another, such as lightweight directory access protocol (LDAP), transport control protocol/Internet protocol (TCP/IP), file transfer protocol (FTP), hypertext transport protocol (HTTP) or wireless application protocol (WAP).

In further detail, business enterprise network 100 generally may include a web services hub 101, one or more data source systems 104, 108, 112, one or more target internal or external web services networks 114, 116, 118, a user registry server 120, an application logging module 122 and a service level monitor (SLM) 124. As shown, web services hub 101 links together several components of business enterprise network 100. In one embodiment, web services hub 101 may be provided to enable dynamic routing and transformation services for web based applications. In such an embodiment, web services hub 101 may support synchronous or asynchronous processing models. Alternatively, web services hub 101 may be implemented to provide mixed mode services by processing incoming requests or messages from data source systems 104, 108, 112 to web services hub 101 synchronously and responses from target internal or external web services 114, 116, 118 asynchronously. Conversely, web services hub 101 may process incoming requests or messages from data source systems 104, 108, 112 to web services hub 101 asynchronously and responses from target internal or external web services 114, 116, 118 synchronously. In another embodiment, web services hub 101 may also be extended to support technology types other than web based applications.

Data source systems 104, 108, 112 may be based on various data types and/or physical or logical locations. For example, data source systems 104, 108, 112 may include systems and applications from computer technologies providers such as Microsoft, Oracle, EMC, Siebel, PeopleSoft, Apache or Netscape. Data source systems 104, 108, 112 may also include systems using database products or standards such as DB2, MQ Series, UDB, XML or FTP files. Data source systems 104, 108, 112 further may include files created or employed by applications such as Microsoft Outlook, Word, Excel or Access, as well as files in standard formats such as ASCII, CSV, GIF, TIF, PNG or PDF. In various embodiments, data source systems 104, 108, 112 may be networks, computer applications or systems at physical or logical locations that are external or internal to business enterprise network 100. In various embodiments, data source systems 104, 108, 112 may be centrally located within business enterprise network 100 or at a remote physical address. Accordingly, messages or requests supplied from data source systems 104, 108, 112 may be in various formats that may or may not be compatible with one another.

In general, target web services 114, 116, 118 may be any of data sources 104, 108, 112 described above. The difference in general nomenclature indicates whether a network, computer application, data system or web services network provides or receives data in the underlying data transformation process. In one embodiment, target web service 114 may be a secured intranet, LAN or WAN, such as, for example, U.S. Bank/Elan.

User registry server 120 may be implemented as an authorization module to review access and transmission rights of users or transactions interfacing with business enterprise network 100. In one embodiment, user registry server 120 may be implemented as an authentication and authorization module configured to verify the identity of users. In such an embodiment, users may supply clear text usernames and passwords for authentication, access and/or transmission rights.

User registry server 120 may be implemented as a lightweight directory access protocol (LDAP) server. In various embodiments, user registry server 120 may be implemented in another protocol, such as, for example, FTP for updating and searching directories run over transmission control protocol/internet protocol (TCP/IP). User registry server 120 also may be implemented as a general computer system comprising processor cores, servers and I/O components. In various embodiments, users may be generic computer systems, data source systems 104, 108, 112 or internal or external networks that may need to send messages or requests over business enterprise network 100. Accordingly, user registry server 120 may be configured to invoke various routines to authenticate data source systems 104, 108, 112 and/or verify access and transmission rights of various computer systems and internal or external networks. In various embodiments, user register server 120 also may support one or more authentication technologies such as encrypted passwords, token-based authentication and/or identity assertion.

Application logging module 122 may be included in business enterprise network 100 to provide system administrators with detailed contextual information for application failures. This may be accomplished by capturing messages relayed from data source systems 104, 108, 112, along with metadata and other system information, and passing them to a logging framework encapsulated within application logging module 122. In one embodiment, application logging module 122 may be implemented in a logging utility such as JAVA-based Apache Log4J. In another embodiment, JAVA-based logging utilities such as JAVA Logging application programming interface (API) or Jakarta Commons Logging may be employed independently or in conjunction with one another or with Apache Log4J in application logging module 122.

Other embodiments of application logging module 122 may include .xml files to configure appenders and logger categories as defined by business enterprise network 100. All transactions and requests from data sources 104, 108, 112 are recorded using unique identifiers for subsequent auditing. In one embodiment, information regarding such transactions may include a globally unique identifier, date and time of transaction or request and identifying information of an initiating user or computer system. In another embodiment, the information recorded by application logging module 122 also may include duration to millisecond precision of message or request related events. In such an embodiment, duration times may include, total time spent in business enterprise network 100 and total time of relay from data source systems 104, 108, 112 to destinations or target web services 114, 116, 118. In various embodiments, support personal and system administrators also may enable logging of other diagnostic information such as message or request contents, response contents and/or developer level debugging and tracing information.

In other embodiments, special identifiers such as, for example, correlation IDs are employed to track requests from data source systems 104, 108, 112. Subsequently, correlation IDs are reported to a diagnostic feature of application logging module 122, such as the nested diagnostics context (NDC) of the Log4J logging utility to allow the correlation ID associated with a current thread of execution to be included with every log message written by the thread.

Further, in various embodiments, application logging module 122 may provide validation of system processes in addition to tracking system activity. This feature may enable system administrators of business enterprise network 100 to perform troubleshooting, customer support and/or auditing services. Accordingly, in such embodiments, this information may be viewed only by internal support personnel.

Service level monitor 124 may be included in business enterprise network 100 to ensure compliance with service level agreement (SLA) objectives. In one embodiment, service level monitor 124 may be implemented using Apache Log4J. For example, Netcool/SLA Manager provided by IBM may be employed in business enterprise network 100 to deliver realtime service modeling and reporting and allow system administrators and/or service personnel to monitor the impact of IT performance on services and SLAs.

In various embodiments, service level monitor 124 may be further configured to apply additional service level rules based on a combination of preferences of system administrators and features of data source systems 104, 108, 112 and target web services 114, 116, 118. For example, service level monitor 124 may fix a general response time and serve owner systems or computer applications of transactions taking longer than the general response time with a warning. In addition, service level monitor 124 may fix a maximum response time and serve owner systems or computer applications of transactions taking longer than the maximum response time with an error message. Alternatively, service level monitor 124 may review the number of repeated transactions in a time period and issue reminders, warnings or errors to owner systems or computer applications.

Figure 2:
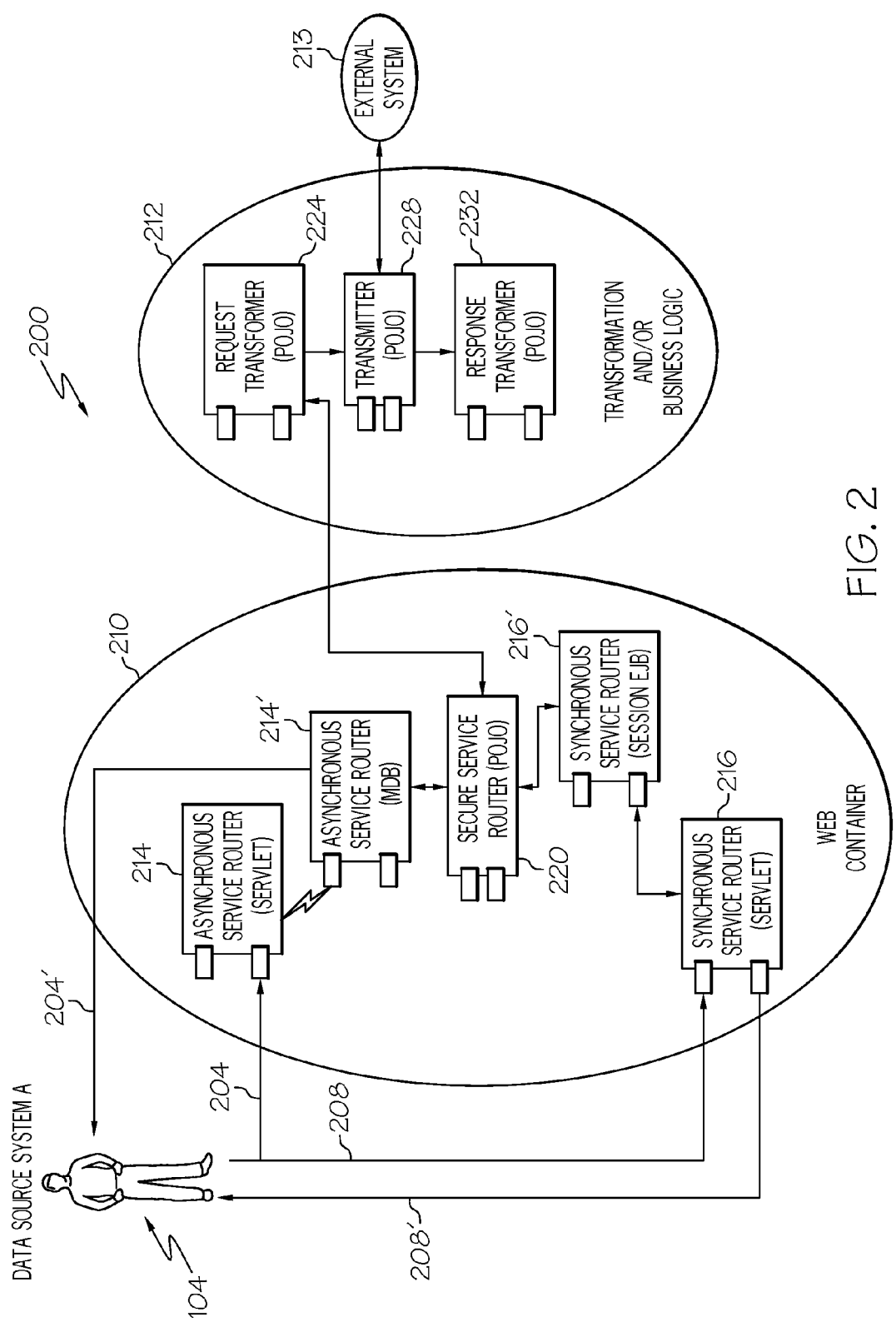
FIG. 2 is one embodiment of a high-level process flow request/response connection topology employed in web services hub.

FIG. 2 is one embodiment of a high-level process flow request/response connection topology 200 employed in web services hub 101. As shown, JAVA Servlet API may be employed in the illustrated embodiment of process flow request/response connection topology 200 to add dynamic content to web services hub 104 using a JAVA platform. Although the illustrated embodiment of process flow request/response connection topology 200 is shown here as implemented using JAVA Servlet API, plain old JAVA object (POJO) programming, enterprise Javabean API and JAVA web container technologies, various other technologies known to those skilled in the art may be employed for this purpose. For example, non-JAVA dynamic web content technologies such as PHP, CGI and ASP. NET also may be employed to create similar dynamic content for web services hub 101.

In one embodiment, process flow request/response connection topology 200 may be implemented by a web container 210 and a transformation and/or business logic module 212 in data communication with an external system 213. As shown, data source system A 104 may send and receive messages to and from process flow request/response connection topology 200 through asynchronous communications channels 204, 204' or synchronous communications channels 208, 208'. Web container 210 comprises asynchronous service routers 214, 214' in data communication with asynchronous communications channels 204, 204', synchronous service routers 216, 216' in data communication with synchronous communications channel 208, 208' and a secure service router 220. Transformation and/or business logic module 212 may include a request transformer 224, a web transmitter 228 and a response transformer 232.

Asynchronous communications channels 204, 204' and synchronous communications channels 208, 208' may be any data communications systems known to those skilled in the art such as high-speed network connections, buses, packet-driven digital interfaces and/or other data communication mechanisms. In various embodiments, process flow request/response lifecycle 200 may be configured to interface with data source system A 104 either only asynchronously over asynchronous communications channels 204, 204' or synchronously over synchronous communications channels 208, 208'.

Generally, web container 210 may provide runtime environment through components that establish naming context and life cycle management. In various embodiments, web container 210 handles the lifecycle for JAVA servlets. As shown, asynchronous service router 214 and synchronous service router 216 may be implemented in JAVA Servlet API. Asynchronous service router 214' may be implemented in enterprise Javabean (EJB) message-driven bean (MDB) API, synchronous service router 216' in stateful or stateless session EJB depending on the type of connection with client data source system A 104, and secure service router 220 in Plain Old JAVA Object (POJO) API. Those skilled in the art will readily recognize that asynchronous service routers 214, 214', synchronous service routers 216, 216' and secure service router 220 may be implemented in a variety of other JAVA or non-JAVA based technologies.

Asynchronous service routers 214, 214' may be employed in "fire-and-forget" or asynchronous mode to execute business services in process flow request/response connection topology 200. In one embodiment, asynchronous service router 214 may be configured to locate and invoke business services capable of handling incoming requests or messages from data source system A 104. Asynchronous service router 214 may identify a suitable business service handler by evaluating the source of the incoming message or request or the message or request type. In various embodiments, a different asynchronous service router 214' may be implemented as an asynchronous response handler to return a response to data source system A 104 over asynchronous communications channel 204'.

Synchronous service routers 216, 216' may be employed in "call-and-wait" or synchronous mode to execute business services in process flow request/response connection topology 200. In one embodiment, synchronous service routers 216, 216' may obtain a business service handler capable of handling an incoming request or message from data source system A 104 by determining the source of the incoming message or request or the message or request type. As shown, synchronous service routers 216, 216' may be further configured to return a response to data source system A 104 over synchronous communication channel 208'.

Secure service router 220 may be implemented to interface with an authorization module, such as a user registry, to review access and transmission rights of data source system A 104. In one embodiment, secure service router 220 may be implemented as an authentication and authorization module configured to verify identity of data source system A 104. In such an embodiment, data source system A 104 may supply a clear text username and password for authentication, access and transmission rights. Secure service router 220 may be implemented in Java to communicate with a user registry using an LDAP protocol or a Java database connectivity (JDBC) protocol to provide authentication and authorization. In various embodiments, secure service router 220 may be implemented in another protocol, such as, for example, FTP. In various embodiments, user registry server 120 may invoke routines to authenticate data source systems 104, 108, 112 and/or verify access and transmission rights of various computer systems and internal or external networks. In other embodiments, user register server 120 also may support one or more authentication technologies such as encrypted passwords, token-based authentication and/or identity assertion.

In various embodiments, transformation and/or business logic module 212 may provide business services implemented as transformation services. Accordingly, transformation and/or business logic module 212 may be designed to process simple request and response transformation along with data transmission. In various embodiments, transformation and/or business logic module 212 may be further configured to (1) package a request from data source system A 104 in a format that external system 213 may understand, (2) execute or transmit the packaged request from data source system A 104 to external system 213 for processing and (3) when external system 213 has completed processing and returned a response, parse the response for data source system A 104. Accordingly, transformation and/or business logic module 212 may be configured to provide developers with an established paradigm, such as package/execute/parse (PEP), an easy to use solution that does not require business logic. As a result, such a paradigm may be easily implemented to provide the desired transformation services. In other embodiments, custom business service implementations may be defined to implement transformation and/or business logic module 212.

In one embodiment, transformation and/or business logic module 212 may be further configured to provide request or response transformation over extensible stylesheet language transformation (XSLT). In various embodiments, transformation and/or business logic module 212 may be configurable at various levels, and even be overridden with custom code specifications. For example, developers may provide custom processing logic to parse a request or response by providing their own request or response transformer in addition to request transformer 224 and response transformer 232 in transformation and/or business logic module 212.

Request transformer 224 may be provided in transformation and/or business logic module 212 to transform messages or requests from data source system A 104. As shown, request transformer 224 may be implemented by POJO programming. Those skilled in the art will readily recognize that request transformer 224 also may be implemented in various other JAVA or non-JAVA technologies.

Web transmitter 228 may be provided in transformation and/or business logic module 212 to transmit transformed messages to external system 213. In one embodiment, a default web services transmitter, such as Apache Axis2 for core web services functionality and Apache Rampart plugin for WS security support may be employed to transmit secured messages to external system 213. In various embodiments, custom implementations based on other technologies such as JDBC API data stores or data access objects (DAO Objects), stateless session beans (enterprise EJB), MDBs, POJOs and/or Spring services may be employed in transformation and/or business logic module 212.

Response transformer 232 may be provided in transformation and/or business logic module 212 to transform responses received from external system 213. As shown, response transformer 232 may be implemented by POJO programming. Those skilled in the art will readily recognize that response transformer 232 also may be implemented in various other JAVA or non-JAVA technologies.

In operation, web container 210 may receive a message or request from data source system A 104 over asynchronous communications channel 204 or synchronous communications channel 208. As described in further detail below, in one embodiment, the message or request may be transmitted over request models such as, for example, extensible markup language (XML) scripts over hypertext transfer protocol (HTTP) and secure hypertext transfer protocol (HTTPS) or simple object access protocol/service oriented architecture protocol (SOAP) over HTTP and HTTPS. Web container 210 may review the uniform resource locator (URL) of the message or request to establish the appropriate request router servlet. For example, synchronous requests may employ a URL of the format: http[s]://<server>[:<port>]/eai/sync/<service>. Asynchronous requests may employ a URL of the format: http[s]://<server>[:port>]/eai/async/<service>.

Based on the URL, asynchronous service router 214 or synchronous service router 216 may forward the message or request to secure service router 220. Secure service router 220 authenticates and authorizes data source system A 104 based on metadata and other information contained in the message or request. In one embodiment, asynchronous service router 214' may return an HTTP 200 status code to data source system A 104 to acknowledge receipt of an asynchronously transmitted message or request by a handler such as, for example a JAVA message service (JMS) provider. Secure service router 220 may then forward the message or request to transformation and/or business logic module 212. In transformation and/or business logic module 212, an appropriate transformation service is invoked to process the message or request. In one embodiment, request transformer 224 may perform transformation of the message or request to adopt the security standard set by external system 213. In another embodiment, request transformer 224 may perform conversion from data source system A 104 format to another format recognizable by external system 213. In various embodiments, web transmitter 213 may transmit the message or request unsigned to external system 213. In various embodiments, the message or request may be signed and/or encrypted employing a standard security protocol such as WS-Security standard supported by Apache Rampart plugin for Axis2.

External system 213 may send a response to transformation and/or business logic module 212. In various embodiments, the response may be forwarded to response transformer 232. In asynchronous routing systems, the response is further submitted to a business service handler specified in the header or meta-information parameter fields of the original message or request from data source system A 104. In synchronous routing systems, the response is directly returned to data source system A 104.

Figure 3:
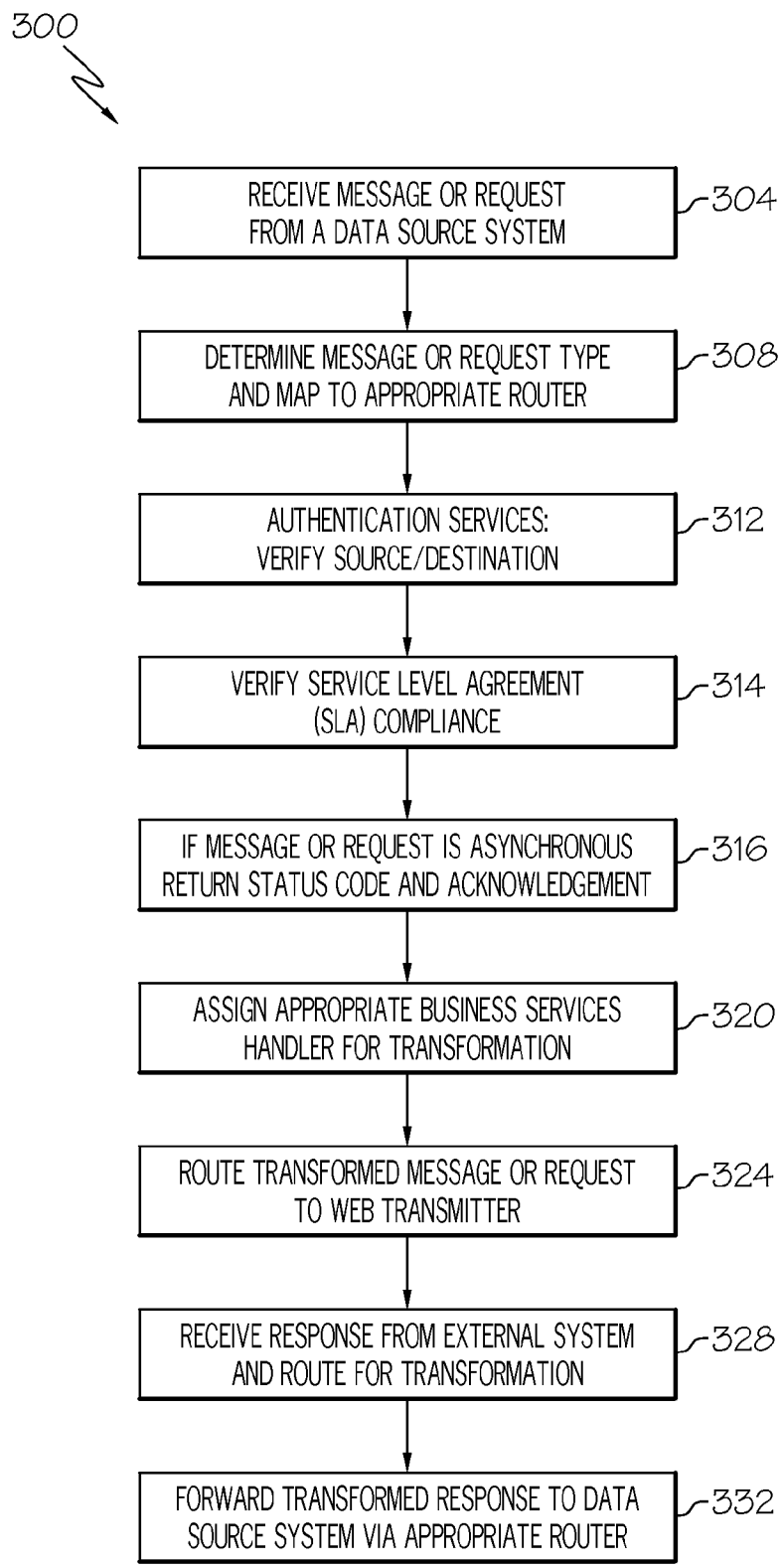
FIG. 3 is a flow-chart that illustrates one embodiment of an exemplary method of transforming requests and responses using web services hub.

FIG. 3 is a logic flow that illustrates one embodiment of an exemplary method 300 of transforming a message or request and response using web services hub 101. Method 300 may be implemented for a message or request and response transmitted in the form of extensible markup language (XML) scripts over hypertext transfer protocol (HTTP) and/or secure hypertext transfer protocol (HTTPS). As shown, web services hub 101 receives 304 a message or request from data source system A 104 over asynchronous communications channel 204 or synchronous communications channel 208.

Web services hub 101 determines 308 the message or request type based on the message or request header parameters, e.g., by reviewing the message or request header parameters, to establish an appropriate service router. Accordingly, web services hub 101 maps the message or request to the appropriate asynchronous service router 214 or synchronous service router 216 based on the message type. In one embodiment, the message or request may be in the form of an XML script provided with a URL specifying the nature of the request. In such an embodiment, an asynchronous request is mapped to asynchronous service router 214, and a synchronous request is mapped to synchronous service router 216.

The designated asynchronous service router 214 or synchronous service router 216 transmits the message or request to secure service router 220.

Secure service router 220 verifies 312 access and transmission rights of data source system A 104 and external system 213. In various embodiments, the request may be dispatched over asynchronous communication channel 204 and/or synchronous communication channel 208 by employing a request model such as, for example, simple object access protocol/service oriented architecture protocol (SOAP) over HTTP and HTTPS. In various embodiments, IBM WebSphere MQ (or IBM MQ series) also may be employed to provide a request model for dispatching requests or messages to an appropriate business or transformation service in transformation and/or business logic module 212.

In one embodiment implementing raw XML scripts over HTTP or HTTPS, a request may be transmitted to an HTTP servlet employing the POST command. In such an embodiment, the request may comprise an XML document in the body of the request and request meta-information contained in HTTP headers.

TABLE 1 illustrates one embodiment of meta-information that may be contained in HTTP headers of an exemplary data request from data source system A 104.

TABLE 1

| Header Parameter | Required | Description |
| --- | --- | --- |
| USERNAME PASSWORD | If using username, username and password are required. | Must represent a valid username in LDAP. Unencrypted password for the LDAP user or data source system. |
| TOKEN TOKEN-TYPE | If using tokens, token and token type is required. | A token that can be used for authenticating the user. A value indicating the type of security token used. |
| REPLY-TO | Yes, if an asynchronous request. | When processing an asynchronous request, this is where the response (if any) should be sent. |
| SOURCE | Yes | The name of the system initiating the request. Used to determine the format of the incoming message and whether transformation will be required before sending the request to the destination system. |

As shown in TABLE 1, the incoming message or request from data source system A 104 may be in the form of an in the form of an XML script comprising one or more HTTP header parameters such as, USERNAME, PASSWORD, TOKEN, TOKEN-TYPE, REPLY-TO and/or SOURCE. In various embodiments, secure service router 220 may employ an authorization/authentication module to review access and transmission rights of data source system A 104. Accordingly, data source system A 104 may supply a username and password as required by the USERNAME and PASSWORD header parameters. In one embodiment, secure service router 220 may be further configured to verify authentication and authorization credentials on behalf of external system 213 to ensure compliance with various network specific security protocols.

In other embodiments, secure service router 220 may support other authentication technologies such as encrypted passwords, token-based authentication using TOKEN and TOKEN-TYPE header parameters and/or identity assertion. As described above, the username and password supplied by data source system A 104 may be verified against an LDAP server.

In one embodiment, secure service router 220 may invoke additional authentication and authorization routines to verify access and transmission rights of data source system A 104 using SOURCE header parameter. In such an embodiment, secure service router 220 may review SOURCE header parameter to determine the format of the incoming request from data source system A 104. Accordingly, secure service router 220 may then determine whether transformation is required before transmitting the request to external system 213.

Web services hub 101 further verifies 314 compliance of the message or request with one or more service level agreement (SLA) objectives. In one embodiment, web services hub 101 may be configured to apply service level rules based on a combination of preferences of system administrators, features of data source system A 104, and requirements of external system 213.

On receipt and/or authentication of message or request, secure service router 220 or an appropriate asynchronous handler returns 316 an acknowledgement or response status code, such as HTTP 200, to data source system A 104. In one embodiment, if the message or request was transmitted asynchronously to web services hub 101, a status or acknowledgement code is sent immediately to data source system A 104.

As shown, transformation and/or business logic module 212 assigns 320 an appropriate business services handler to the incoming message or request for transformation services. The transformation service is a business service implementation designed to provide simple message or request transformation. In one embodiment, transformation and/or business logic module 212 also may perform transformation of the corresponding response to transmitted message or request from data source system A 104.

Transformation and/or business logic module 212 routes 324 the transformed message or request to web transmitter 228. In various embodiments, the transformed message may be encapsulated in a SOAP envelope and signed or encrypted using the WS-Security standard. Accordingly, Apache Rampart plug-in for Axis2 may be employed to provide digital certification to the transmitted message or request.

Transformation and/or business logic module 212 receives 328 a response from external system 213 and routes the response to a response transformer 232. Response transformer 232 may transform the response from external system 213 to a format recognizable by data source system A 104. In various embodiments, transformation and/or business logic module 212 may forward the response from external system 213 without transformation. In one embodiment, a response from external system 213 to an asynchronous message or request from data source system A 104 is handled by a service specified in the REPLY-TO header parameter of the original XML document.

Web services hub 101 further forwards 332 the transformed response to data source system A 104 by employing the appropriate asynchronous service router 214' or synchronous service router 216. In one embodiment, if no service is specified in the REPLY-TO header parameter field of the original XML document, the response from external system 213 is discarded. In other embodiments, if the original message or request was transmitted over synchronous communication channel 208, synchronous service router 216 simply returns the response from external system 213 over synchronous communication channel 208'.

Figure 4:
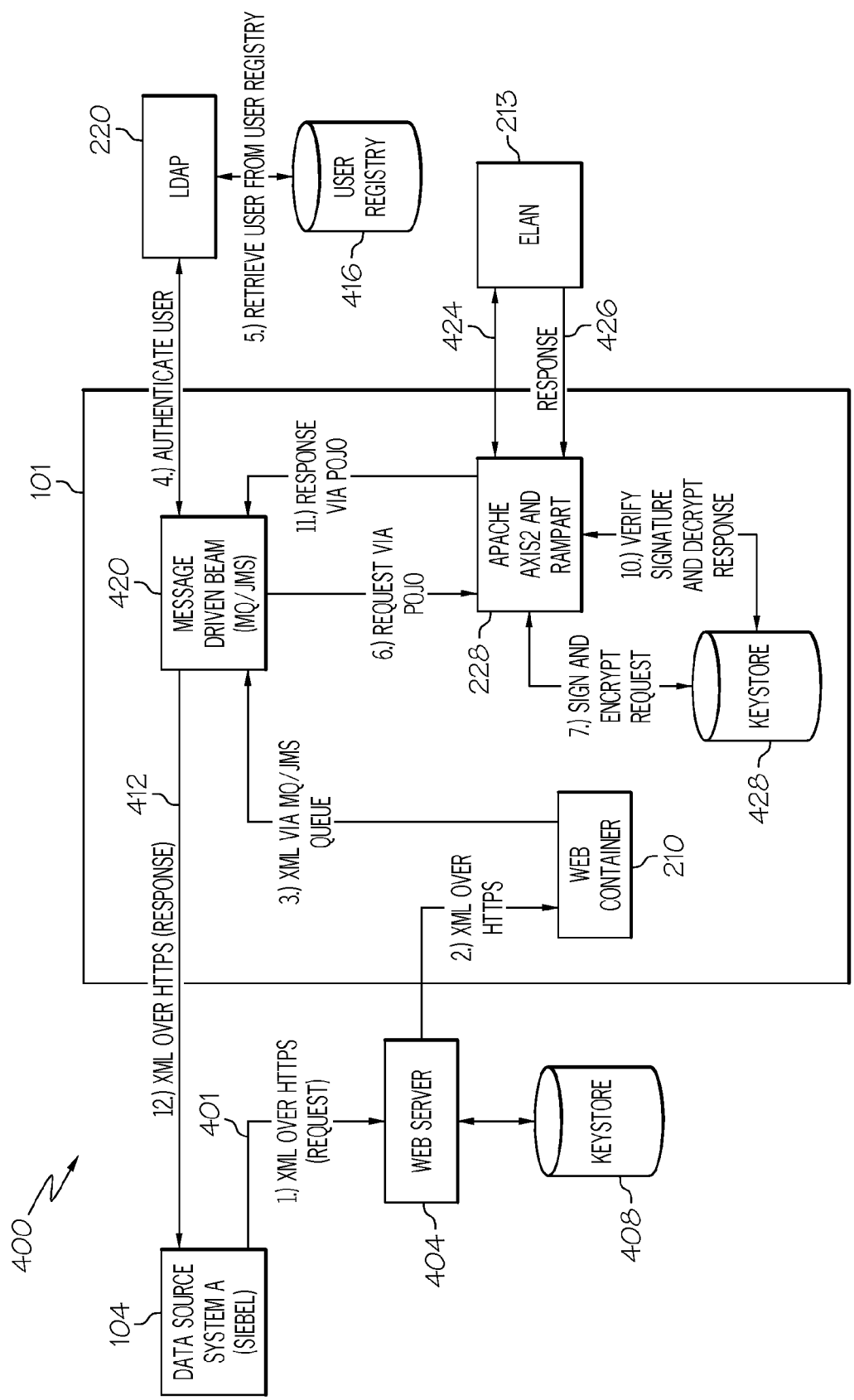
FIG. 4 is a high-level flow diagram that illustrates one embodiment of a process flow connection topology carrying out an exemplary transformation of a request from a data source system.

FIG. 4 is a high-level flow diagram that illustrates one embodiment of process flow connection topology 400 carrying out transformation of an exemplary request 401 from data source system A 104. As shown, process flow connection topology 400 comprises data source system A 104, a web server 404, a first keystore 408, web services hub 101, a secure service router 220 implemented as an LDAP server, a user registry 416 and external system 213. Web services hub 101 further comprises web container 210, a queue processor 420 implemented by a message-driven bean EJB API (listening to an MQ/JMS queue), a secure response transmission channel 412, web transmitter 228 implemented by Apache Axis2 and Rampart, a secure request/response transmission channel 424 and a second keystore 428.

In various embodiments, data source system A 104 may be customer relationship management (CRM) systems and computer applications provided by a computer technologies vendor such as Siebel. In other embodiments, external system 213 may be a secured network, for example, U.S. Bank/Elan network. U.S. Bank/Elan network interface requires application clients and computer systems such as for example, data source system A 104 to assign an X.509 client digital certificate using the OASIS Web Services Security (WSS) WS-Security v1.1 standard to request 401 transmitted to external system 213.

Web server 404 may be a computer system that delivers web content. In one embodiment, web server 404 may provide a secure socket layer (SSL) termination point to data source system A 104. Accordingly, web server 404 may be implemented by an Internet Information Server from Microsoft, an Apache HTTP Server from Apache Software Foundation, an iPlanet Web Server from iPlanet E-Commerce Solutions or other suitable Web server platform.

First keystore 408 may be implemented as an SSL keystore file containing both public and private keys. In one embodiment, public keys may be stored as signer certificates while private keys may be stored in personal certificates. Keys from first keystore 408 may be used to verify authenticity and data integrity of request 401 prior to transmission.

Queue processor 420 may be provided in web services hub 101 to listen to an input queue of incoming messages or requests contained in web container 210. In one embodiment, queue processor 420 may process messages in a JAVA message oriented middleware (MOM) API implementation such as, for example, a JAVA messaging service (JMS) queue. As shown, queue processor 420 may be implemented as a message driven bean EJB, to process request 401 received by the JMS queue in web container 210.

As shown, data source system A 104 may transmit request 401 to web server 404 in the form of an XML document employing for example, an HTTP POST command. Data source system A 104 may transmit request 401 over a cryptographic protocol such as secure sockets layer (SSL) to web server 404. Web server 404 may verify authorization and access rights of data source system A 104 based on request 401. In addition, first keystore 408 may assign a public or private encryption key digital signature to request 401. Web server 404 may then transmit request 401 over a secure connection protocol such as, for example, XML over HTTPS to web container 210.

In one embodiment, request 401 may be published to a JMS queue in web container 210. In such an embodiment, queue processor 420 listening to the JMS queue may forward request 401 to secure service router 220. On receipt of request 401, secure service router 220 may authenticate data source system A 104 based on information specified in the HTTP header parameter fields of request 401. In another embodiment, secure service router 220 may authenticate the information specified in HTTP header parameter fields of request 401 against LDAP user registry 416.

Secure service router 220 may further locate a transformation service or business services handler capable of handling request 401. In one embodiment, secure service router 220 may forward transformed request 401 to a web transmitter 228 for transmission to external system 213. In another embodiment, web transmitter 228 may sign and encrypt request 401 employing second keystore 428. In various embodiments, transmission to external system 213 is established over secure request/response transmission channel 424 by a secure communications protocol such as SOAP over HTTPS. External system 213 may return a response 426 in encrypted form over secure request/response transmission channel 424. As shown, second keystore 428 and web transmitter 228 may transform and forward response 426 back to queue processor 420. Queue processor 420 may then transmit response 426 to data source system A 104 over secure response transmission channel 412.

These are representative implementations of intermediary web services hub 101 in accordance with the illustrative embodiments described herein. Those of ordinary skill in the art will readily appreciate that the various systems and methods disclosed herein are exemplary only and that the illustrative embodiments can operate within a number of different data communication environments. Furthermore, various embodiments described herein may be implemented at any level, ranging from hardware to application software and in any appropriate physical location or operating system.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, JAVA, BASIC, Perl, Matlab, Pascal, Visual BASIC, assembly language, machine code, and so forth. The embodiments are not limited in this context.

In various implementations, intermediary web services hub 101 may be illustrated and described as comprising several separate functional elements, such as modules and/or blocks. Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, DSPs, PLDs, ASICs, circuits, registers), software components (e.g., programs, subroutines, logic) and/or combination thereof.

In various embodiments, intermediary web services hub 101 may comprise multiple modules connected by one or more communications media. Communications media generally may comprise any medium capable of carrying information signals. For example, communications media may comprise wired communications media, wireless communications media, or a combination of both, as desired for a given implementation. Examples of wired communications media may include a wire, cable, printed circuit board (PCB), backplane, semiconductor material, twisted-pair wire, co-axial cable, fiber optics, and so forth. An example of a wireless communications media may include portions of a wireless spectrum, such as the radio-frequency (RF) spectrum. The embodiments are not limited in this context.

The modules may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The embodiments are not limited in this context Unless specifically stated otherwise, it may be appreciated that terms such as "processing," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices.

As used herein, "data source" or "data target" are intended to have the broadest possible meaning consistent with these terms, and shall include a database, a plurality of databases, a repository information manager, a queue, a message service, a repository, a data facility, a data storage facility, a data provider, a website, a server, a computer, a computer storage facility, a CD, a DVD, a mobile storage facility, a central storage facility, a hard disk, a multiple coordinating data storage facilities, RAM, ROM, flash memory, a memory card, a temporary memory facility, a permanent memory facility, magnetic tape, a locally connected computing facility, a remotely connected computing facility, a wireless facility, a wired facility, a mobile facility, a central facility, a web browser, a client, a laptop, a personal digital assistant ("PDA"), a telephone, a cellular phone, a mobile phone, an information platform, an analysis facility, a processing facility, a business enterprise system or other facility where data is handled or other facility provided to store data or other information, as well as any files or file types for maintaining structured or unstructured data used in any of the above systems, or any streaming, messaged, event driven, or otherwise sourced data, and any combinations of the foregoing, unless a specific meaning is otherwise indicated or the context of the phrase requires otherwise. A storage mechanism is any logical or physical device, resource, or facility capable of acting as a data source or data target.

"Business processes," "business services" and "business transactions" as used herein, shall include any methods, service, operations, processes or transactions that can be performed by a business, including, without limitation, sales, marketing, fulfillment, inventory management, pricing, product design, professional services, financial services, administration, finance, underwriting, analysis, contracting, information technology services, data storage, data mining, delivery of information, routing of goods, scheduling, communications, investments, transactions, offerings, promotions, advertisements, offers, engineering, manufacturing, supply chain management, human resources management, data processing, data integration, work flow administration, software production, hardware production, development of new products, research, development, strategy functions, quality control and assurance, packaging, logistics, customer relationship management, handling rebates and returns, customer support, product maintenance, telemarketing, corporate communications, investor relations, and many others.

"Enterprise JAVA Bean (EJB)" shall include the server-side component architecture for the J2EE platform. EJBs support rapid and simplified development of distributed, transactional, secure and portable JAVA applications. EJBs support a container architecture that allows concurrent consumption of messages and provide support for distributed transactions, so that database updates, message processing, and connections to enterprise systems using the J2EE architecture can participate in the same transaction context.

"JMS" shall mean the JAVA Message Service, which is an enterprise message service for the JAVA-based J2EE enterprise architecture. "JCA" shall mean the J2EE Connector Architecture of the J2EE platform described more particularly below. It should be appreciated that, while EJB, JMS, and JCA are commonly used software tools in contemporary distributed transaction environments, any platform, system, or architecture providing similar functionality may be employed with the data integration systems described herein.

While certain features of the embodiments have been illustrated as described herein, many modifications, substitutions, changes and equivalents will now occur to those skilled in the art. It is therefore to be understood that the appended claims are intended to cover all such modifications and changes as fall within the true scope of the embodiments.

The invention claimed is:

1. A system, comprising:
a web services hub comprised of hardware, the hardware comprising at least one non-transitory memory connected to at least one processor, the web services hub configured to receive a request from a data source system that is external to the web services hub; transform the request into a transformed request, and transmit the transformed request to an external system, the request to be transformed by the web services hub into the transformed request by a process comprising:
the web services hub evaluating the data source system identified in the request as being a source of the request,
the web services hub identifying a business service handler configured to transform the request,
the web services hub transforming the request via the business service handler such that the transformed request is in a format that is understandable and processable by the external system; and
the web services hub to receive a response to the transformed request from the external system after the external system has completed processing of the transformed request and transmitted a response to the transformed request, the web services hub to parse the response to the transformed request for the data source system and transform the response to the transformed request into a transformed response to send to the data source system such that the transformed response is understandable and processable by the data source system;
a secure service router coupled to the web services hub, the secure service router to authenticate the data source system prior to the transformed request being sent to the external system.

2. The system of claim 1, comprising:
a web container coupled to the data source system;
a queue processor coupled to the web container: coupled to the data source system via a first secure transmission channel; and coupled to the secure service router, the queue processor to listen to an input queue of the request contained in the web container.

3. The system of claim 2, wherein the web service hub comprises:
a web transmitter coupled to the queue processor and coupled to the external system via a second secure transmission channel; and
a first keystore coupled to the web transmitter;
wherein the first keystore and the web transmitter transform the response and forward the transformed response from the external system to the queue processor.

4. The system of claim 3, wherein the queue processor transmits the transformed response to the data source system over the first secure response transmission channel.

5. The system of claim 2, comprising:
a web server coupled to the web container, the web server to deliver web content and provide a first secure connection to the data source system, the web server to receive the request over a cryptographic protocol and to verify access authorization and access rights of the data source system based on the request; and
a second keystore coupled to the web server, the second keystore comprising a keystore file containing both public and private encryption keys.

6. The system of claim 5, wherein the second keystore assigns a public or private encryption key digital signature to the request and the web server transmits the request over a second secure connection to the web container.

7. A system, comprising:
a web services hub comprising a web container and a queue processor, the web services hub comprising hardware, the hardware comprised of non-transitory memory connected to at least one processor;
the web container coupled to a data source system to receive a request from a data source system;
the queue processor coupled to the web container, coupled to the data source system via a secure response transmission channel, and coupled to a secure service router, the queue processor to listen to an input queue of the request contained in the web container;
wherein the secure service router is operative to authenticate the data source system and locate a transformation service to transform the request such that the request is transformed by the transformation service via a transformation process comprising:
transforming the request such that the transformed request is in a format that is understandable and processable by an external system; and
the web services hub to receive a response to the transformed request from the external system after the external system has completed processing of the transformed request and transmitted a response to the transformed request, the web services hub to parse the response to the transformed request for the data source system and transform the response to the transformed request into a transformed response to send to the data source system such that the transformed response is understandable and processable by the data source system.

8. The system of claim 7, wherein the web services hub comprises:
a web transmitter coupled to the queue processor and coupled to the external system via a secure response transmission channel; and
a first keystore coupled to the web transmitter; and
wherein the first keystore and the web transmitter transform the response from the external system and forward the transformed response to the queue processor for subsequently sending to the data source system.

9. The system of claim 8, wherein the queue processor transmits the transformed response to the data source system over the secure response transmission channel.

10. The system of claim 7, comprising:
a web server coupled to the web container, the web server to deliver web content and provide a first secure connection to the data source system, the web server to receive the request over a cryptographic protocol and to verify access authorization and access rights of the data source system based on the request; and
a second keystore coupled to the web server, the second keystore comprising a keystore file containing both public and private encryption keys.

11. The system of claim 10, wherein the second keystore assigns public or private encryption key digital signature to the request and the web server transmits the request over a second secure connection to the web container.

12. A method, comprising:
receiving, at a web services hub, a request from a data source system, the web services hub comprised of hardware, the hardware comprising at least one non-transitory memory connected to at least one processor;

transforming, by the web services hub, the request into a transformed request by a transformation process comprising:

the web services hub evaluating the data source system identified in the request as being a source of the request, the web services hub identifying a business service handler configured to transform the request, the web services hub transforming the request via the business service handler such that the transformed request is in a format that is understandable and processable by an external system; and transmitting, by the web services hub, the transformed request to an external system;

authenticating, by the web services hub, the data source system; and receiving, by the web services hub, a response to the transformed request from the external system after the external system has completed processing of the transformed request and transmitted a response to that transformed request;

parsing, by the web services hub, the response to the transformed request received from the external system for the data source system;

transforming, by the web services hub, the response to the transformed request into a transformed response to send to the data source system such that the transformed response is understandable and processable by the data source system; and sending, by the web services hub, the transformed response to the data source system.

13. The method of claim 12, comprising:

listening, by a queue processor, to an input queue of the request contained in a web container of the web services hub, wherein the web container is coupled to the data source system and the queue processor; and wherein the queue processor is coupled to the data source system via a first secure transmission channel.

14. The method of claim 13, wherein a first keystore and a web transmitter of the web services hub transforms the response from the external system; and the method comprises:

forwarding, by the first keystore and the web transmitter, the transformed response to the queue processor; and wherein the web transmitter is coupled to the queue processor and the first keystore; and wherein the web transmitter is coupled to the external system via a second secure transmission channel.

15. The method of claim 14, wherein the queue processor transmits the transformed response to the data source system over the first secure transmission channel.

16. The method of claim 12, comprising:

delivering, by a web server coupled to the web container, web content;

providing, by the web server, a first secure connection to the data source system;

receiving, by the web server, the request over a cryptographic protocol; and verifying, by the web server, access authorization and access rights of the data source system based on the request;

wherein a second keystore is coupled to the web server and comprises a keystore file containing both public and private encryption keys.

17. The method of claim 16, comprising:

assigning, by the second keystore, at least one public or private encryption key digital signature to the request; and transmitting, by the web server, the request over a second secure connection to the web services hub.

* * * * *